United States Patent
Chen et al.

(10) Patent No.: US 8,935,200 B2
(45) Date of Patent: Jan. 13, 2015

(54) DYNAMIC DATABASE DUMP

(75) Inventors: Dong Sheng Chen, Beijing (CN); Yan Jia, Haidian District Beijing (CN); Shu Hua Liu, Haidian District Beijing (CN); Xiang Zhou, Chaoyang District Beijing (CN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/367,689

(22) Filed: Feb. 7, 2012

(65) Prior Publication Data
US 2012/0221512 A1    Aug. 30, 2012

(30) Foreign Application Priority Data
Feb. 28, 2011    (CN) .......................... 2011 1 0051642

(51) Int. Cl.
G06F 17/30    (2006.01)
(52) U.S. Cl.
CPC .............. *G06F 17/30286* (2013.01)
USPC .......................................................... 707/609
(58) Field of Classification Search
CPC ............... G06F 17/30002; G06F 17/30023; Y10S 707/99933; Y10S 707/99941
USPC .......................................................... 707/609
See application file for complete search history.

(56) References Cited

U.S. PATENT DOCUMENTS

| 6,374,267 | B1* | 4/2002 | Tam ......................................... 1/1 |
| 7,047,231 | B2 | 5/2006 | Grasshoff et al. |
| 7,155,426 | B2 | 12/2006 | Al-Azzawe |
| 7,849,111 | B2* | 12/2010 | Huffman et al. .............. 707/813 |
| 2007/0156644 | A1 | 7/2007 | Johnson et al. |
| 2009/0094229 | A1 | 4/2009 | Ferrel et al. |
| 2009/0172051 | A1 | 7/2009 | Huffman et al. |

FOREIGN PATENT DOCUMENTS

| CN | 1877569 A | 12/2006 |
| KR | 20040039648 A | 5/2004 |
| KR | 100798577 | 1/2008 |

OTHER PUBLICATIONS

Chinese Office Action for Application No. 2011-10051642.0 dated Feb. 18, 2014; 7 pages.

* cited by examiner

*Primary Examiner* — Cheryl Lewis
(74) *Attorney, Agent, or Firm* — Cantor Colburn LLP

(57) ABSTRACT

Controlling a dump for a database by determining a state of a diagnosis flag associated with the structured query language (SQL) statement in response to a SQL statement being executed for the database. The diagnosis flag is used to indicate if a database dump should be performed. A database dump is performed for the SQL statement in response to determining that the diagnosis flag indicates that a dump is to be performed.

17 Claims, 7 Drawing Sheets

DYNAMIC DATABASE DUMP

PRIORITY

This application claims priority to Chinese Application No. 201110051642.0, filed Feb. 28, 2011 the contents of which in its entirety are herein incorporated by reference, with all the benefits accruing therefrom under 35 U.S.C. §119.

DESCRIPTION OF THE RELATED ART

As known in the art, databases play a significant role in modern information technology. Relational database systems are widely used for storing and retrieving various kinds of information. Data stored in a relational database may be manipulated using structured query language (SQL). SQL is a structured programming language that is designed for creating database queries and to perform operations on a database. SQL statements describe the high-level criteria of data retrieval but do not involve the concrete details of a database system. This abstraction property of SQL frees development and maintenance personnel from having to consider the underlying operations (such as locations, access methods of data, etc.) of a database, and greatly improves the efficiency and convenience of database development and maintenance. In order to support such abstraction, however, a database management system (such as a Relational Database Management System, RDBMS) is required to have more complex functions in order to perform concrete underlying operations.

During development, debugging, and maintenance of a database management system relevant personnel usually need to diagnose problems in the database management system in order to find the root causes of these problems. The diagnosis is performed by relying on SQL errors that occur during the operation of the database so that necessary database modification and/or maintenance may be performed. As the complexity of relational database management systems increases, the diagnosis of SQL problems becomes more and more difficult.

In particular, if a SQL error in a database operation occurs on the client side and cannot be recreated in a lab environment, then it is difficult for development and maintenance personnel to accurately diagnose the cause of this error. This is often an issue with database development because in the lab environment it is difficult to request data and/or tables that exactly match the client context where the real error has occurred, and even more difficult to recreate the real environment scenario where the problem has occurred.

In order to diagnose these types of unrepeatable SQL problems several solutions have been proposed in the prior art. For example, in some existing solutions, the diagnosis of a database problem relies on log and trace techniques. However, such solutions cannot reflect a logical error of an application (such as a program) that operates on the database, and also usually consumes a huge quantity of calculation, memory, and time resources. In addition, these solutions are not problem-specific.

Specifically, according to such solutions, a tool for capturing an SQL trace is hard coded in the source code of a database engine. A trace is monitoring-orientated rather than orientated to specific problem diagnosis. Moreover, in a typical Online Transaction Processing (OLTP) RDBMS system, there are usually a large number of SQL packages (i.e. groupings of related SQL statements, functions, and procedures) and each of them contains a number of individual SQL statements. These SQL statements can be executed simultaneously and in parallel against the RDBMS address space. So tracing the execution of all the SQL statements can be very expensive, therefore a common trace policy may not be effective for specific SQL statements. In addition, the trace is mainly includes auditing, runtime, performance, or duration data, and therefore the internal data structure and data associated with the SQL statements are not included.

Another type of existing database diagnosis solution is referred to as a dump. Generally speaking, according to this kind of solution, at a specific instant or when a specific condition is satisfied, all or part of content of a memory device associated with the RDBMS address space (such as a memory operated by RDBMS) is copied to and recorded in another memory device so as to generate dump data. Hence, the dump data may be regarded as an "on-scene-snapshot" of the memory space at this specific instant or under this specific condition. In turn, values of a register of a Central Processing Unit (CPU) may be used as entry points to determine the application access state and variables in the client environment at the time of error.

SUMMARY OF THE INVENTION

An embodiment includes a method of controlling a dump for a database. The method includes determining a state of a diagnosis flag associated with the structured query language (SQL) statement in response to a SQL statement being executed for the database. The diagnosis flag is used to indicate if a dump should be performed. A dump is performed for the SQL statement in response to determining that the diagnosis flag indicates that a dump is to be performed.

A further embodiment includes an apparatus for controlling a dump for a database. The apparatus includes a flag determining circuit configured to determine a state of a diagnosis flag associated with a structured query language (SQL) statement for a database in response to the SQL statement being executed. The diagnosis flag indicates whether a dump should be performed. The apparatus additionally includes a dump performing circuit configured to perform a dump for the SQL statement in response to determining that the state of the diagnosis flag indicates that a dump is to be performed.

An additional embodiment includes a system for controlling a dump for a database. The system includes a flag setting apparatus configured to set a diagnosis flag associated with a structured query language (SQL) statement. The diagnosis flag indicates if a dump should be performed. The system additionally includes an SQL executing apparatus configured to execute the SQL statement. The system further includes a dump controlling apparatus configured to control the dump for the SQL statement according to the diagnosis flag associated with the SQL statement when the SQL executing apparatus executes the SQL statement.

Yet another embodiment includes a computer program product for controlling a dump for a database. The computer program product includes a tangible storage medium readable by a processing circuit and storing instructions for execution by the processing circuit for performing a method. The method includes determining a state of a diagnosis flag associated with the SQL statement in response to a structured query language (SQL) statement being executed for the database. The diagnosis flag is used to indicate if a dump should be performed. A dump is performed for the SQL statement in response to determining that the diagnosis flag indicates that a dump is to be performed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The above and other objects, features, and advantages of embodiments of the present invention will become easier to understand from the following detailed description with reference to the figures. In the figures, several embodiments of the present invention are illustrated by way of illustration instead of limitation, wherein.

DETAILED DESCRIPTION

A more detailed description of the embodiments of the present invention will be presented below by referring to the figures. As described above and discussed below in detail, it is possible to perform a continuous and dynamic dump at the level of structured query language (SQL) statements, for example, a continuous and dynamic dump for an internal memory. In particular, it is possible to perform a dump for any specific step during the execution of an SQL statement. By refining the granularity and level of a dump, the diagnosis and analysis of an SQL problem become more accurate and more flexible.

Figure 1:
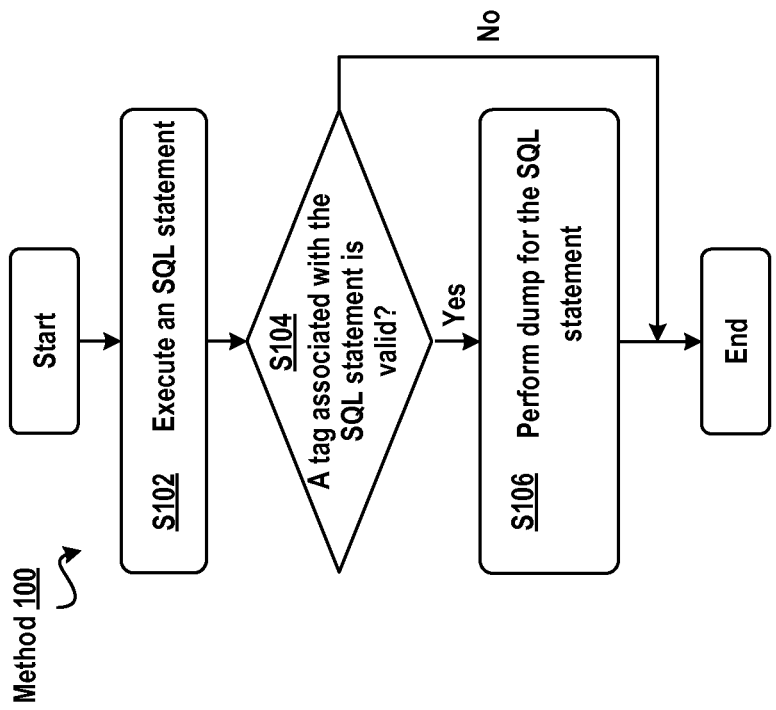
FIG. 1 illustrates a process flow for controlling a dump for a database according to an embodiment of the present invention.

Reference is first made to FIG. 1, which illustrates a flowchart of a method 100 of controlling a dump for a database according to one embodiment of the present invention. An SQL statement for a database is executed at block S102. It will be understood by those of ordinary skill in the art that the SQL statement may be for storing, accessing, retrieving or performing other operations that are currently known or to may be developed in future for processing data stored in a database.

At block S104, in response to the SQL statement being executed, the state of a diagnosis flag associated with this SQL statement is determined, i.e., whether the diagnosis flag is set to be valid. According to embodiments of the present invention, each SQL statement has a flag associated with it, which is referred to as a "diagnosis flag," for indicating whether to perform a dump on the SQL statement. Specifically, when the state of a diagnosis flag is valid, it indicates that a dump of this specific SQL statement shall be performed; on the contrary, when the state of a diagnosis flag is invalid, it indicates that a dump of this SQL statement shall not be performed.

The diagnosis flag may be implemented by any proper means that is currently known or to be developed in future. In an embodiment, the diagnosis flag is implemented using a specific bit. When the value of the bit equals "1," the dump will be performed; when the value of the bit equals "0," the dump will not be performed. In an additional embodiment, the diagnosis flag is implemented using a Boolean variable. When the value of the Boolean variable is "TRUE," the dump will be performed; when the value of the Boolean variable is "FALSE," the dump will not be performed. The embodiments described are examples of possible implementations of the diagnosis flag, however, other implementations are also feasible, and the scope of the embodiments of the present invention is not limited in this regard.

In operation, a user (such as those responsible for development and/or maintenance of a database management system) may create and manipulate a diagnosis flag associated with an executed SQL statement whenever diagnosis is needed. In an embodiment, creating and setting a diagnosis flag may be performed in a lab environment. For example, for an SQL statement that is suspected of causing a database operation error, the user may use specific means to create a diagnosis flag and set it to indicate that a dump should be performed. A detailed discussion will be presented below on how to create and set diagnosis flags for different types of SQL statements.

Generally SQL statements may be categorized into two types: static SQL statements and dynamic SQL statements. A static SQL statement is an SQL statement that will not change at runtime, and thus is hard coded in an application. On the contrary, a dynamic SQL statement refers to an SQL statement that is constructed at runtime. Further, a static SQL statement is divided into two cases: where the static SQL statement is bound and where it is not bound. One or more bound static SQL statements may be included in a structure referred to as a package.

According to embodiments of the present invention, if the user wants to diagnose a dynamic SQL statement or an unbound static SQL statement, the user will set the diagnosis flag by adding a customized keyword to the SQL statement. For example, in an embodiment of the present invention, a customized keyword, such as "WITH DIAGNOSE," may be added to an SQL statement. An SQL statement to which the above customized keyword has been added is given below, as an example.

a. SELECT * FROM T1, T2
      i. WHERE T1.C1=T2.C1
      ii. WITH DIAGNOSE;

It is to be understood that the keyword given here and the location where the keyword is added are examples used for clarity and that any other customized keywords and manners of adding them are feasible, and the scope of the embodiments of the present invention is not limited in this regard.

In an embodiment, for any SQL statement to which a customized keyword has been added, an RDMBS system will automatically set a diagnosis flag associated with this SQL statement in order to indicate that a dump is to be performed. When an instance of an SQL statement is executed, a diagnosis flag may be set at the thread on which the instance of the SQL statement is running. In an additional embodiment, the diagnosis flag is set at runtime by using any other method. For example, it is possible to save diagnosis flags associated with respective SQL statements in an accessible memory location and/or a file. The scope of the embodiments of the present invention is not limited in this regard.

For a bound static SQL statement, the diagnosis flag may be set by a customized database command. For example, according to some embodiments of the present invention, the customized command may be in a form such as:

a. SET DIAGNOSE PACKAGE (X) STMTNO (Y)

The parameter X is a package that contains the involved SQL statement. The package is obtained from a binding. The parameter Y indicates a location of the involved SQL statement in the package. It is to be understood that the customized command given here for setting a diagnosis flag is merely provided for clarity, and that any other customized database commands may be used for setting a diagnosis flag associated with a bound static SQL statement. The scope of the embodiments of the present invention is not limited in this regard.

This type of customized database command may be sent to an entity such as a command controller in RDBMS. In response to receiving the command, the command controller locates an SQL statement to be processed in the package that contains the bound static SQL statements, and then adds a diagnosis flag to it. When the SQL statement is executed by the RDMBS system, the state of a diagnosis flag associated with the SQL statement may be set to be valid at runtime according to the added diagnosis flag set by the command controller. As stated above, the diagnosis flag may be set at a thread that is executing the instance of the SQL statement.

It is to be understood that the above descriptions are merely exemplary. Based on the teaching provided here, those skilled in the art may use any proper means that is currently known or to be developed in future, for setting the state of a diagnosis flag associated with a specific SQL statement in runtime.

Returning to FIG. 1, at block S104, if the state of the diagnosis flag associated with the SQL statement is determined not set then the method 100 ends. In this case, the SQL statement may be executed conventionally without any diagnosis action.

On the other hand, if the state of the diagnosis flag is set at block S104, then processing continues at block S106 where a dump is performed to this SQL statement. Specifically, some or all contents of a memory space (e.g., a specific memory block in a memory) associated with the SQL statement are copied and recorded thereby generating dump data for the user to perform analysis and for subsequent processing. The database dump operation may be implemented in any manner that is currently known or to be developed in future. The scope of the embodiments of the present invention is not limited in this regard. Upon completion of block S106, the method 100 ends.

In an embodiment of the present invention, because a diagnosis flag is specific to an SQL statement, a dump is performed for an individual SQL statement, rather than for an entire application of the database. Moreover, for each dumped SQL statement, it is possible to use dump configuration information to control what contents in the associated memory space shall be copied and recorded, rather than dumping all of the contents in the space. In this way, it is possible to more flexibly and more efficiently diagnose the impact of the execution of each SQL statement on the system.

In an embodiment of the method 100, a dump is performed not only at the SQL statement level, but also may be performed for one or more of the processing steps included in the SQL statement. Therefore, it is possible to further refine the granularity and improve the controllability and flexibility of the dump operation.

Figure 2:
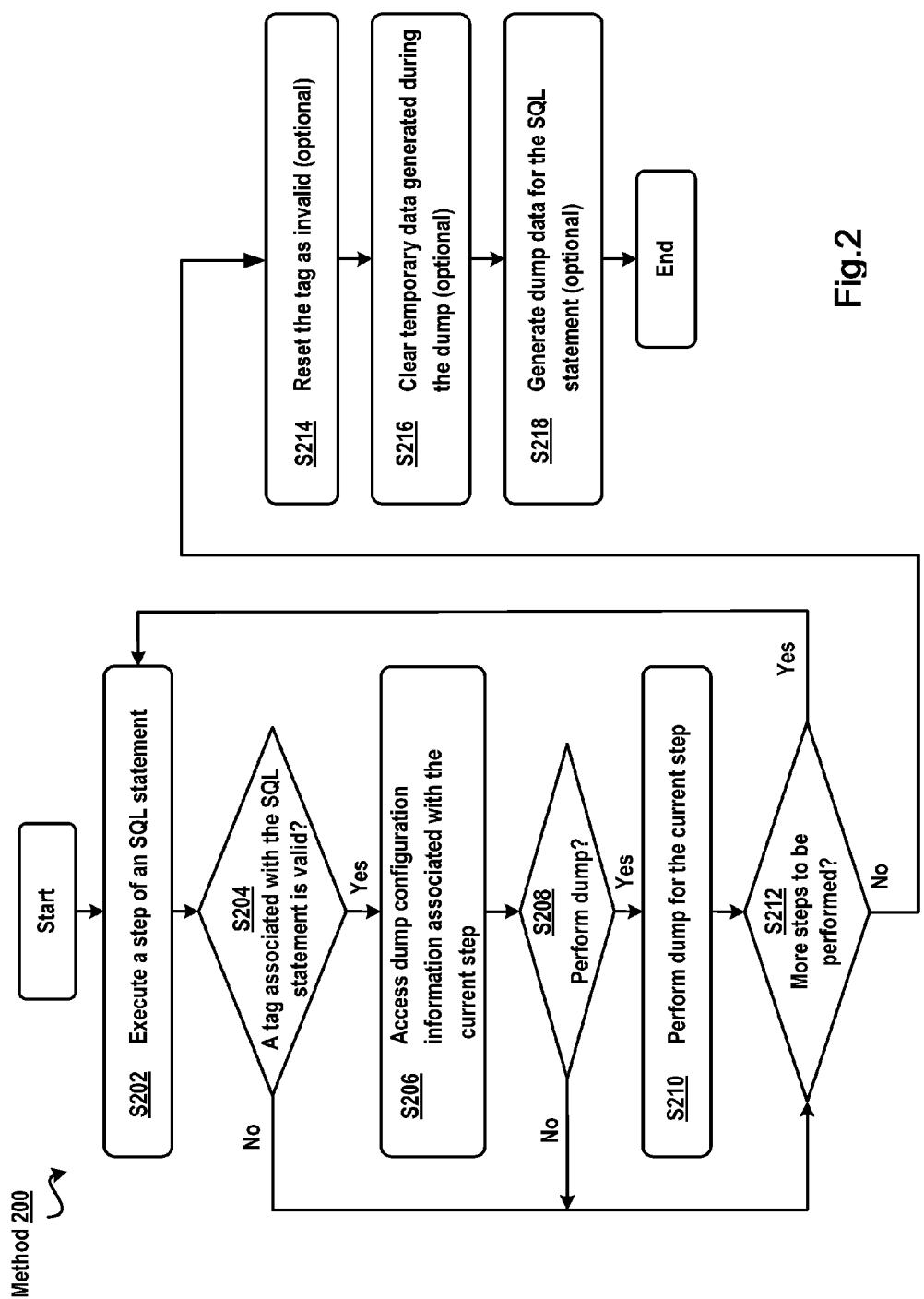
FIG. 2 illustrates a process flow for controlling a dump for a database according to an additional embodiment of the present invention.

FIG. 2 illustrates a process flow of controlling a dump for a database according to an additional embodiment of the present invention. It is to be understood from the following description that the method 200 reduces the dump granularity further to each processing step included in an SQL statement.

After the method 200 starts, the steps included in an SQL statement are performed at block S202. As known in the art, one or more processing steps are performed in order to complete the logical operations described by any SQL statement. These processing steps are often performed in sequence. Therefore, when the execution of a given SQL statement starts, the first processing step included in this statement is performed at block S202.

At block S204, it is determined whether the state of a diagnosis flag associated with the current SQL statement is set, the diagnosis flag indicating whether to perform a dump. It is to be understood that block S204 is an embodiment of block S104 that has been described with reference to FIG. 1. In other words, the determination of the state of the diagnosis flag is done in response to the execution of processing steps included in the SQL statement.

When each processing step included in the current SQL statement is performed, the state of the same diagnosis flag associated with the SQL statement is checked. In other words, although the method 200 may perform operations with respect to each processing step included in the SQL statement, the diagnosis flag remains at the SQL statement level, as it was in the method 100 above. The diagnosis flag associated with the SQL statement and a method for setting the same are similar to what has been described with reference to FIG. 1, and thus are not detailed here.

If it is determined at block S204 that the state of the diagnosis flag associated with the SQL statement indicates that a dump should not be performed, then the SQL statement does not need to be diagnosed. In this case, the method 200 proceeds to block S212, where it is determined whether there are additional processing steps to be performed. If there are, then processing continues at block S202.

On the other hand, if it is determined at block S204 that the state of diagnosis flag associated with the current SQL statement indicates that a dump should be performed, processing continues at block S206. At block S206, dump configuration information associated with the current processing step is accessed. It should be noted that unlike a diagnosis flag, dump configuration information is specific to each processing step of a SQL statement. That is, although a diagnosis flag is present at the SQL statement level, dump configuration information is present at the processing step level. According to some embodiments of the present invention, dump configuration information may be contained, for example, in a corresponding dump configuration file. In other embodiments, dump configuration information may also be implemented in any other manner known in the art. The scope of the embodiments of the present invention is not limited in this regard.

Next, processing continues at block S208 in which, according to the dump configuration information accessed at block S206, it is determined whether to perform a dump for the current processing step. If a dump is to be performed, processing continues at block S210, where a dump for the current processing step is performed based on dump configuration information associated with the current processing step. Otherwise, processing continues at block S212 where it is determined if there are more processing steps to be performed.

In an embodiment, dump configuration information associated with each processing step indicates whether to perform a dump for this processing step and may indicate the details of a dump. Therefore, a dump is not only specific to an SQL statement but also specific to each processing step. More specifically, if a diagnosis flag of an SQL statement is set (indicating that this SQL statement is to be dumped), it is possible to further control whether to perform a dump for each processing step and to set the details of a dump, using dump configuration information, so that different memory space areas, snippets, or data of interest is captured in order to diagnose different SQL problems more efficiently.

Table 1, shows an example of dump configuration information associated with respective processing steps 1-N in embodiments of the present invention. By defining different dump configuration information, it is possible to capture any portion of a runtime memory space associated with an SQL statement when any processing step of the SQL statement is performed. It is to be understood that although in Table 1 dump configuration information associated with different steps is shown to be included in one table, in other embodiments the configuration information may be stored using other methods as is known in the art.

TABLE 1

Example of Dump Configuration Information Associated with Processing Steps

|  | Dump Flag | Data Structure |
| --- | --- | --- |
| Processing Step 1 |  |  |
| SQL Parser | Y | Dump Entry 1 |
|  |  | Dump Entry 2 |
|  |  | Dump Entry 3 |
| Processing Step 2 |  |  |
| Query Semantic & Transformation | Y | Dump Entry 1 |
|  |  | Dump Entry 2 |
|  |  | Dump Entry 3 |
| Processing Step 3 |  |  |
| Access Path Selection Processing Step N-1 | N |  |
| Runtime Processing Step N | Y | Dump Entry 1 |
| Data/Index/Buffer Manager | Y | Dump Entry 1 |

In the example shown in Table 1, dump configuration information associated with each step may contain one or more "dump entries." A "dump entry" is a data structure that is used for defining a linked list of memory blocks and their internal structures in a memory space. As an example, Table 2 shows an example of dump entries ENTRY1 and ENTRY2 associated with a processing step. The dump entries shown in Table 2 specify which specific memory blocks in a memory space need to be copied and recorded when a specific processing step is performed. In this example, these memory blocks are specified using structures BLOCK1, BLOCK2, and BLOCK4.

TABLE 2

Example of Dump Entries

ENTRY1: <TYPE='ENTRY' VALUE='R4' STRUCTURE='BLOCK1'>
ENTRY2: <TYPE='ENTRY' OFFSET='00000000 58F0067A'
    i. LENGTH='4' STRUCTURE='BLOCK4'>
[BLOCK1] TYPE='BLK' LENGTH=150
BLK1PTR1 TYPE='PTR' OFFSET=23 LENGTH=2
STRUCTURE=BLOCK1
BLK1PTR2 TYPE='PTR' OFFSET=29 LENGTH=2
STRUCTURE=BLOCK2
[BLOCK2] TYPE='BLK' LENGTHFLD=BLK2LEN
BLK2LEN TYPE='LENGTH' OFFSET=2 LENGTH=2
BLOCK4] TYPE='BLK' LENGTH=100

As shown in Table 2, dump entries "ENTRY1" and "ENTRY2" are a starting point or an entry point of the dumping operation. According to embodiments of the present invention, in order to determine which memory blocks are to be dumped, a dump entry may specify a CPU register; for example, the parameter VALUE in ENTRY1 is "R4," which indicates CPU register R4. Alternatively, in other embodiments, a dump entry may also directly specify an absolute address or an offset address in a memory space, such as the parameter OFFSET in ENTRY2.

Take the dump entry ENTRY1 for example. Its parameter VALUE is R4, and its parameter STRUCTURE is "BLOCK1." This indicates that register R4 stores an address of a memory block defined by the structure BLOCK1. In addition, the following parameters associated with structure BLOCK1 are further included in the exemplary dump entries shown in Table 2: LENGTH, which specifies a length of a memory block; BLK1PTR1 and BLK2PTR2, are types of pointers, and each is pointing to another block structure (another BLOCK1 structure and another BLOCK2 structure in this example).

Figure 3:
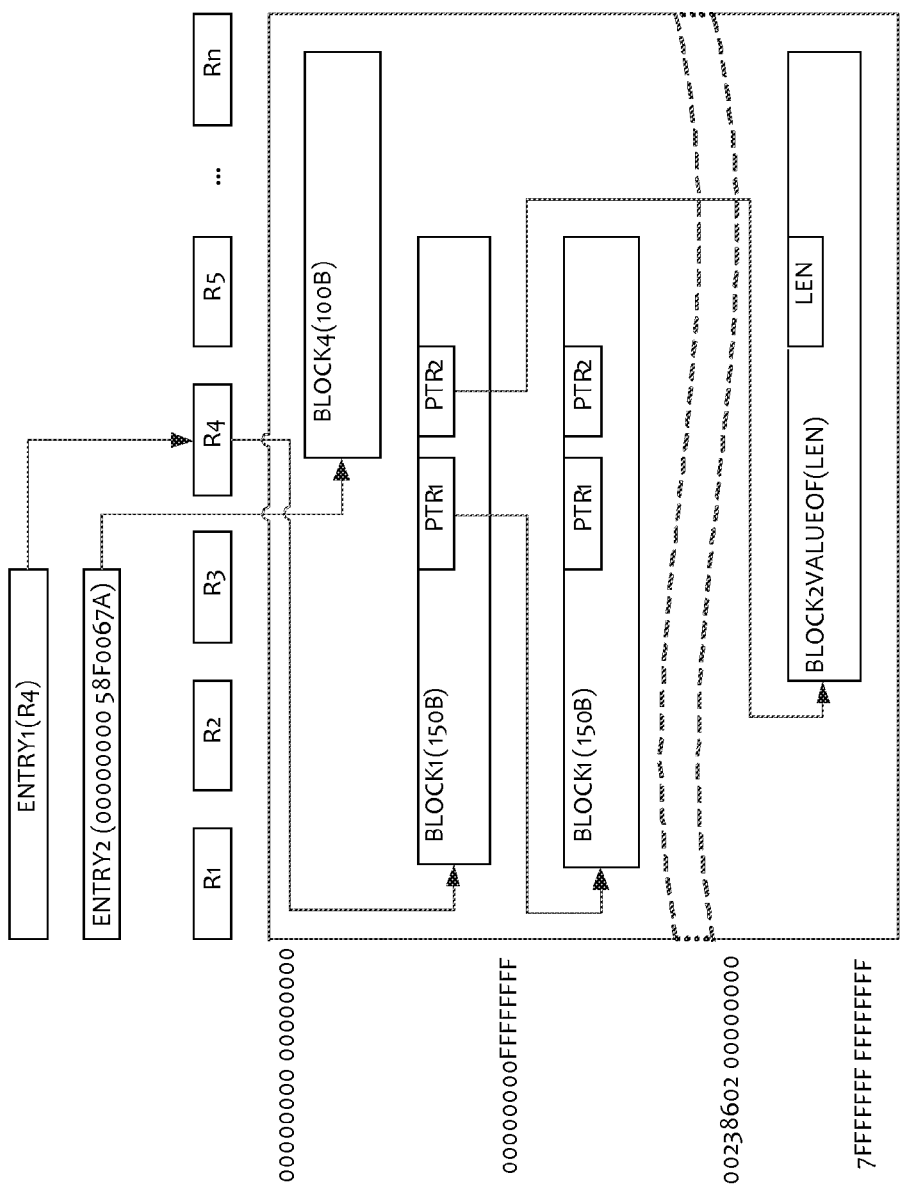
FIG. 3 illustrates a schematic view of a result of a database dump obtained by using the method according to the embodiment of the present invention.

FIG. 3, is schematic diagram of a dumping process corresponding to the dump entries in Table 2. In the example illustrated in FIG. 3, the dump starts from "ENTRY1" and "ENTRY2." In particular, for ENTRY1, the dumping operation accesses the register R4, and determines a location of BLOCK1 in the memory space according to a value saved in this register. Subsequently, the dumping process starts performing the dump from this location, i.e., copying and recording content and information at the memory address, for a length that equals to a value specified by the parameter LENGTH (150 bytes in this example). Then, the dumping process determines two memory blocks (defined by structures BLOCK1 and BLOCK2, respectively) that are to be processed subsequently, according to pointers BLK1PTR1 and BLK2PTR2 associated with the current structure BLOCK1. This process is repeated until the dump for all memory blocks in the dump entry linked list is completed.

It is to be understood that the dump configuration information shown in Table 1, the dump entries shown in Table 2, and relevant descriptions are all provided for clarity. Those skilled in the art may implement dump configuration information and dump entries in any structure and manner known in the art. The scope of the embodiments of the present invention is not limited in this regard.

Returning to FIG. 2, after the dump for the processing step is performed at block S210, the method 200 proceeds to block S212 where it is determined whether or not the current SQL statement includes additional processing steps to be performed. If there are additional processing steps, then processing continues at block S202.

It is to be understood that although the dump for the current processing step is performed before the next processing step is performed, this is merely for purposes of illustration and clarity and is not necessary or limiting. In an embodiment, the dump for a processing step may be carried out before, when, or after other processing step is performed. The scope of the embodiments of the present invention is not limited in this regard.

If all of the processing steps of the current SQL statement have been performed, processing continues at block S214 where the diagnosis flag is reset to indicate that a dump should no longer be performed. As described above, in embodiments of the present invention, a diagnosis flag associated with an SQL statement may be presented at a thread level for a thread that is executing the instance of the SQL statement. A single thread may run one or more SQL statements. After the execution and the dump of an SQL statement are completed, the diagnosis flag may be preferably reset in order to avoid affecting other SQL statements running on the same thread. However, it is to be understood that block S214 is optional. For example, if only one SQL statement is running on a thread, or if a diagnosis flag of an SQL statement is not present at the thread level, block S214 may be omitted. For another example, if the last processing step included in an SQL statement determines that a diagnosis flag associated with this SQL statement is not set, the diagnosis flag does not need to be reset. In this case, block S214 may also be omitted.

Next, in some embodiments, the processing continues at block S216 where temporary data generated during the dump are removed. It is to be understood that block S216 is also optional. Block S216 is performed to avoid a waste of system resources. However, when the resource pressure does not need to be considered and/or other resource management policy is adopted, step S216 may be omitted.

The method 200 proceeds to block S218 to generate dump data for the SQL statement based on the dump for the processing steps. According to embodiments of the present invention, it is possible to integrate the dump results for respective processing steps in any proper manner, so as to generate dump data for the whole SQL statement. It should be noted that block S218 is also optional. In fact, in some cases the user might only focus on a dump for specific processing steps of the SQL statement. Further, the user might diagnose a corresponding problem merely according to the dump for one of more specific processing steps. In these cases, a SQL-level dump result may be generated without integrating results of respective processing steps, i.e., block S218 may be omitted.

The method 200 ends after completion of block S218. It is to be understood from the foregoing description that according to embodiments of the present invention, the dump is not only specific to an SQL statement but also specific to any processing step of an SQL statement.

Figure 4:
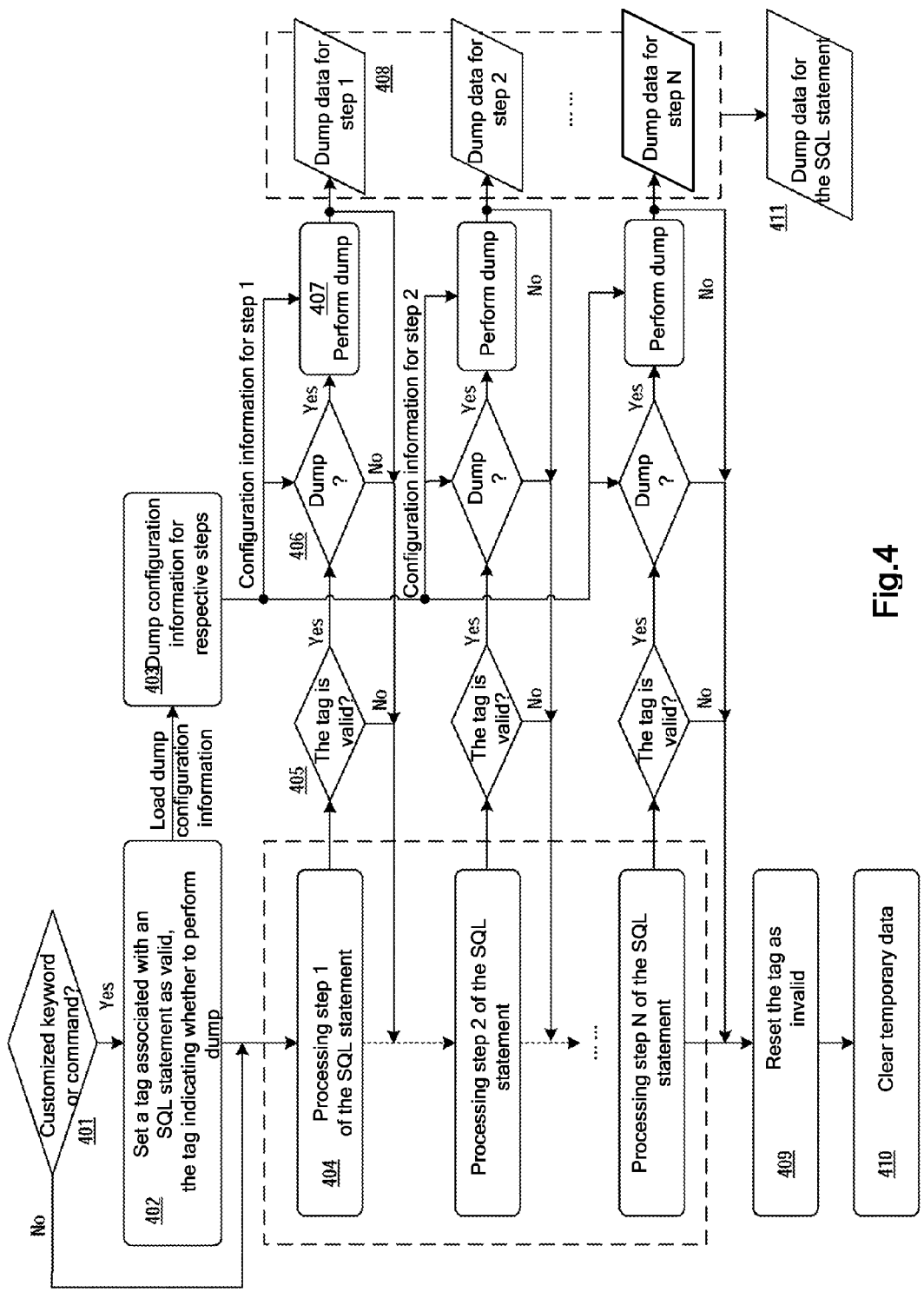
FIG. 4 illustrates a process flow for a SQL statement by using the method according to the embodiment of the present invention.

FIG. 4 is a schematic diagram of the process of processing an SQL statement by using the method according to embodiments of the present invention. The schematic diagram illustrated in FIG. 4 reflects the execution of the process level dump process, such as the process level dump process described with regard to FIG. 1.

At block 401 it is determined whether a user (e.g., a manager or an expert responsible for the diagnosis of a database problem) indicates an SQL statement is to be diagnosed. As described above, when a user wants to diagnose an SQL statement, the user may make an indication by adding a customized keyword (for a dynamic SQL statement or an unbound static SQL statement) to this SQL statement, or by sending a customized database command (for a bound static SQL statement). Therefore, it is determined in block 401 whether the SQL statement has a customized keyword or receives a customized database command.

If it is determined that the SQL statement is to be dumped, then the state of a diagnosis flag associated with this SQL statement is set at block 402. At block 403, dump configuration information is loaded to obtain configuration information associated with each processing step of the current SQL statement.

In block 404, the first processing step (i.e., Processing Step 1) of the SQL statement is performed. At block 405 it is determined whether the state of the diagnosis flag associated with the SQL statement is set. If the state of the diagnosis flag is not set, a next processing step (Processing Step 2) is then performed. If the state of the diagnosis flag is set, then dump configuration information of Processing Step 1 is accessed, and at block 406 it is determined according to the dump configuration information whether to perform a dump for Processing Step 1.

If it is determined not to perform a dump according to the dump configuration information, then a next processing step is performed. If in block 406 it is determined to perform a dump for Processing Step 1, then at block 407, a dump is performed according to the dump configuration information in step 1. As a result, dump data for step 1 is obtained, at block 408. A similar operation is performed on each subsequent processing step.

After similar operations are performed on all of the processing steps for the SQL statement, optionally, at block 409, the state of the diagnosis flag is reset to indicate that a dump should no longer be performed, and temporary data generated during the dump are cleared at block 410. In addition, optionally, at block 411, integrate dump data for respective steps 1-N are integrated in order to obtain dump data for the SQL statement, at block 411.

Figure 5:
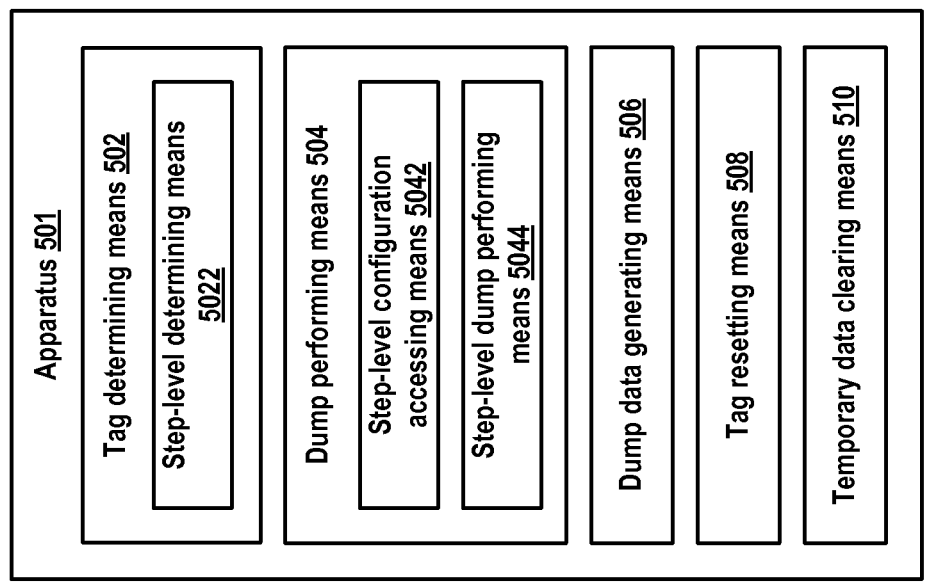
FIG. 5 illustrates a schematic diagram of an apparatus for controlling a database dump according to an embodiment of the present invention.

FIG. 5, depicts a schematic diagram of an apparatus 501 for controlling a dump for a database according to embodiments of the present invention. It is to be understood that in some embodiments of the present invention, the apparatus 501 may be used as an entity for performing the method 100 and the method 200 described with reference to FIG. 1 and FIG. 2, respectively.

As illustrated in FIG. 5, according to embodiments of the present invention, the apparatus 501 comprises a flag determining means 502, configured to determine the state of a diagnosis flag associated with an SQL statement for a database in response to the SQL statement being executed, the diagnosis flag indicating whether to perform the dump. The apparatus further includes a dump performing means 504, configured to perform a dump for the SQL statement in response to the state of the diagnosis flag indicating that a dump is to be performed.

According to some embodiments of the present invention, the flag determining means 502 may further include step-level determining means 5022, configured to determine the state of the diagnosis flag in response to a processing step included in the SQL statement being performed. The dump performing means 504 may further include step-level configuration accessing means 5042, configured to access dump configuration information associated with the processing step, and step-level dump performing means 5044, configured to perform the dump for this processing step according to the dump configuration information in response to the dump configuration information indicating that a dump should be performed.

According to an optional embodiment of the present invention, the apparatus 501 may further include dump data generating means 506, configured to generate dump data for the SQL statement based on the dump for a processing step.

According to an optional embodiment of the present invention, the apparatus 501 may further include flag resetting means 508, configured to reset the diagnosis flag as invalid in response to the completion of the dump for the SQL.

According to an optional embodiment of the present invention, the apparatus 501 may further include temporary data clearing means 510 configured to clear temporary data generated during the dump in response to the completion of the dump for the SQL statement.

The apparatus 501 is configured to execute the blocks of the method 100 described with reference to FIG. 1 and the method 200 described with reference to FIG. 2. Hence, all features and operations described for the method 100 and the method 200 are also suitable for the apparatus 501 and thus are not further detailed.

It is further to be understood that the apparatus 501 may be implemented in various manners, including software, hardware, firmware, or an arbitrary combination thereof. For example, in some embodiments, the apparatus 501 may be implemented using software and/or firmware modules. Alternatively or additionally, the apparatus 501 may be implemented using hardware modules. For example, the apparatus 501 may be implemented as an Integrated Circuit (IC) chip or an Application-Specific Integrated Circuit (ASIC). Also, the apparatus 501 may be implemented as a System On-Chip (SOC). Other manners, whether currently known or developed in future, are possible as well. The scope of the embodiments of the present invention is not limited in this regard.

Figure 6:
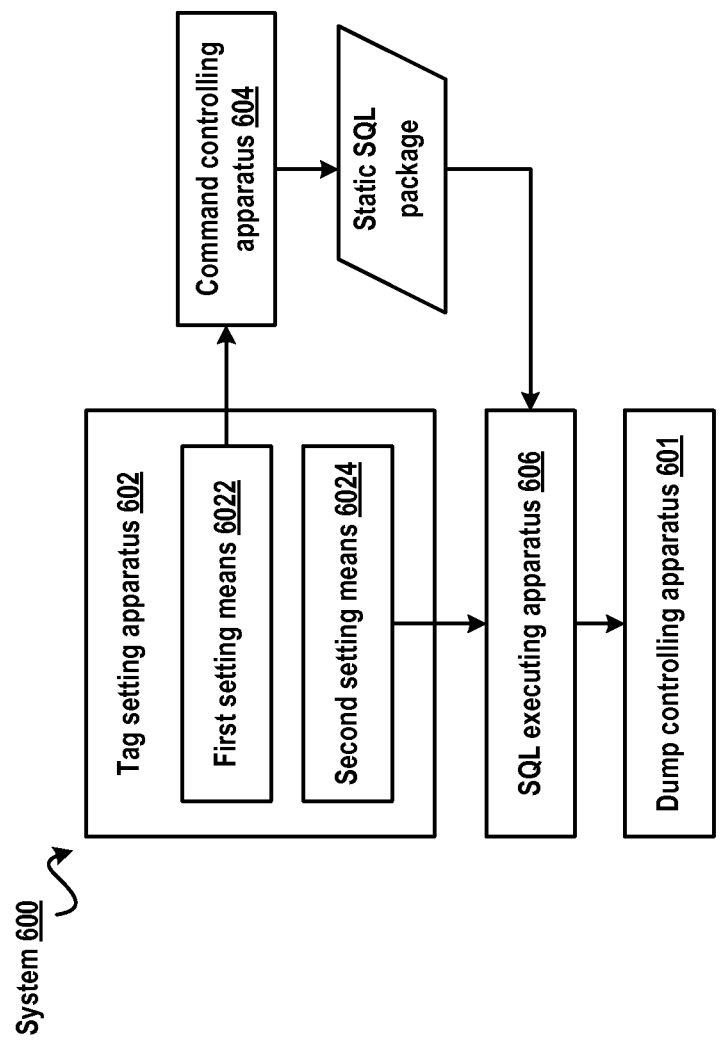
FIG. 6 illustrates a schematic diagram of a system for controlling a database dump according to an embodiment of the present invention.

FIG. 6, depicts a block diagram of a system 600 for controlling a dump for a database according to embodiments of the present invention. According to embodiments of the present invention, the system 600 includes a flag setting apparatus 602, configured to set a diagnosis flag associated with an SQL statement, the diagnosis flag indicating if a dump should be performed. According to embodiments of the present invention, the flag setting apparatus 602 may be used by, for example, database development and maintenance personnel to set a diagnosis flag for an SQL statement and or its processing steps to be diagnosed.

The system 600 further includes an SQL executing apparatus 606, configured to execute the SQL statement. Further, the system 600 includes a dump controlling apparatus 601, configured to control a dump for the SQL statement according to the diagnosis flag associated to the SQL statement, in response to the SQL executing apparatus 606 executing the SQL statement. In particular, according to embodiments of the present invention, the dump controlling apparatus 601 is configured to perform the processes described with regard to FIG. 1 and FIG. 2.

As described above, it might be necessary to use different policies for creating and setting diagnosis flags for different types of SQL statements. To this end, according to embodiments of the present invention, the flag setting apparatus 602 may further include a first setting means 6022, configured to generate a customized database command in response to the SQL statement being a bound static SQL statement, wherein the customized database command may be in the form as described in FIG. 1, for example.

In these embodiments, the system 600 further includes a command controlling apparatus 604, configured to set, in response to the customized database command, the diagnosis flag by manipulating a package that contains static SQL statements. For example, according to some embodiments of the present invention, in response to receiving a customized database command, the command controlling apparatus 604 may locate in the static SQL package an SQL statement that needs to be diagnosed, and add a specific flag to the static SQL statement. Accordingly, when the SQL statement is executed, the state of the associated diagnosis flag may be set according to the specific flag in the static SQL statement. The example operations of the command controlling apparatus are provided for clarity, it will be understood that other implementations are also feasible. The scope of the embodiments of the present invention is not limited in this regard.

In addition, in order to process a dynamic SQL statement or a static SQL statement that is not bound, the flag setting apparatus 602 may further include second setting means 6024, configured to set the diagnosis flag by adding a customized keyword to the SQL statement in response to the SQL statement being a dynamic SQL statement or an unbound static SQL statement. When the SQL statement is executed, the state of the diagnosis flag may be set according to the keyword. Exemplary forms of the customized keyword and a method for using the same have been described above and thus are not detailed here.

It is to be understood that according to embodiments of the present invention, in the system 600 described with reference to FIG. 6, the flag setting apparatus 602 may be used by, for example, expert users such as development and/or maintenance personnel to diagnose specific SQL statements, and that the command controlling apparatus 604, the SQL executing apparatus 606, and the dump controlling apparatus 601 may be implemented as parts of the database management system.

Figure 7:
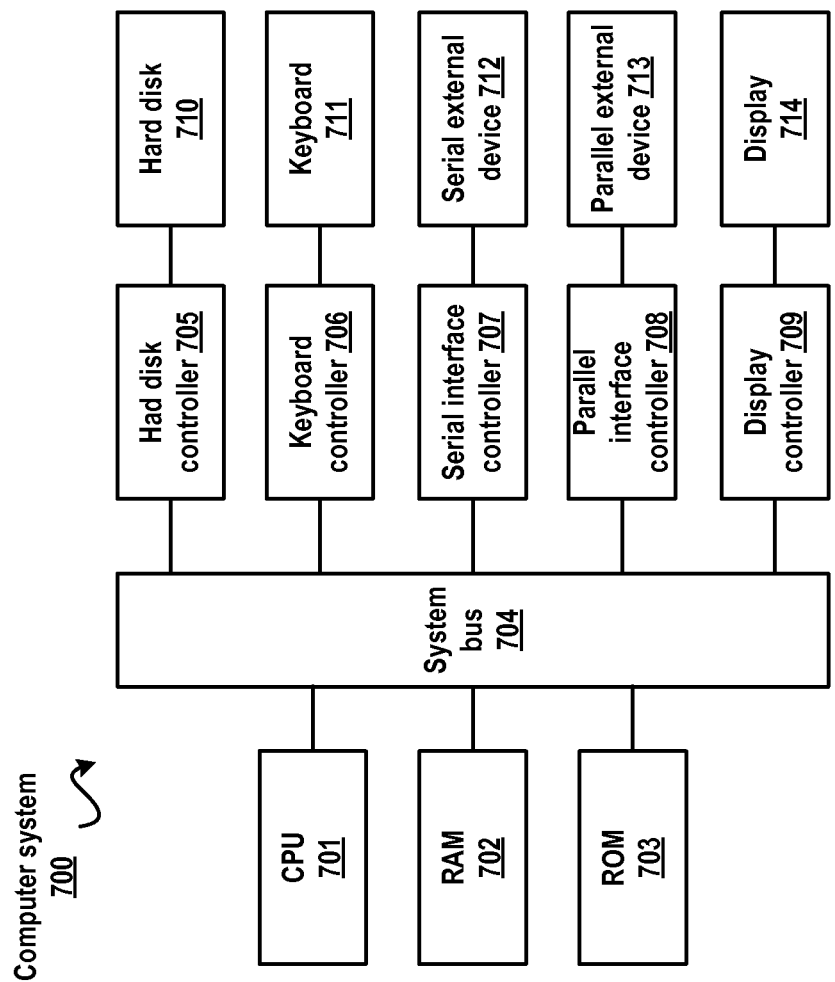
FIG. 7 illustrates a schematic diagram of exemplary computer system on which embodiments of the present invention may be implemented.

FIG. 7 depicts a schematic diagram of a computer system 700 in which embodiments according to the present invention may be implemented. As illustrated, the computer system 700 includes a CPU (central processing unit) 701, RAM (random access memory) 702, ROM (read only memory) 703, a system bus 704, a hard disk controller 705, a keyboard controller 706, a serial interface controller 707, a parallel interface controller 708, a display controller 709, a hard disk 710, a keyboard 711, a serial external device 712, a parallel external device 713 and a display 714. Among these components, the CPU 701, the RAM 702, the ROM 703, the hard disk controller 705, the keyboard controller 706, the serial interface controller 707, the parallel interface controller 708, and the display controller 709 are connected to the system bus 704. The hard disk 710 is connected to the hard disk controller 705. The keyboard 711 is connected to the keyboard controller 706. The serial external device 712 is connected to the serial interface controller 707. The parallel external device 713 is connected to the parallel interface controller 708. The display 714 is connected to the display controller 709. It is to be understood that the schematic diagram illustrated in FIG. 7 is merely one possible embodiment of a computer system provided for clarity, and that other computer system implementations as are known in the art may be used in other embodiments. Furthermore, some devices may be omitted and/or others added according to user requirements.

In addition to a hardware implementation, embodiments of the present invention may be implemented as a computer program product. For example, both the method 100 described with reference to FIG. 1 and the method 200 described with reference to FIG. 2 may be implemented as a computer program product. The computer program product may be stored in the RAM 702, the ROM 703, the hard disk 710 as illustrated in FIG. 7 and/or any proper memory medium, or be downloaded to the computer system 700 from a proper location via a network. The computer program product may comprise a computer code portion, which includes program instructions executable by a processing apparatus (e.g., the CPU 701 illustrated in FIG. 7). The program instructions include instructions for determining the state of a diagnosis flag associated with a SQL statement for a database in response to the SQL statement being executed, the diagnosis flag indicating whether to perform a dump, and instructions for performing the dump for the SQL statement in response to the state of the diagnosis flag being determined as valid.

The idea and principles of the embodiments of the present invention have been explained by means of several embodiments of the present invention. As is clear from the foregoing description, with embodiments of the present invention, it is possible to perform continuous, dynamic dump at the SQL statement level in a selective manner. Particularly, the dump may be performed for a processing step of the SQL statement, whereby the dump granularity and level are refined. In this way, various kinds of SQL problems may be diagnosed more accurately, flexibly, and pertinently.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the present invention have been presented for purposes of illustration and description, but are not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of controlling a dump for a database, comprising:
   in response to a structured query language (SQL) statement being executed for the database, determining a state of a diagnosis flag associated with the SQL statement, the diagnosis flag indicating whether to perform a dump;
   performing, by a computer, a dump for the SQL statement in response to determining that the diagnosis flag indicates that a dump is to be performed; and
   for each of one or more processing steps for the SQL statement:
      executing the processing step;
      determining the state of the diagnosis flag in response to executing the processing step;
      accessing dump configuration information associated with the processing step; and
      performing the dump for the processing step based on the dump configuration information, in response to the dump configuration information indicating a dump is to be performed.

2. The method according to claim 1, further comprising: generating dump data for the SQL statement based on the dump for the processing step.

3. The method according to claim 1, further comprising: resetting the diagnosis flag as invalid in response to completion of the dump for the SQL statement.

4. The method according to claim 1, further comprising: clearing temporary data generated during the dump in response to completion of the dump for the SQL statement.

5. The method according to claim 1, wherein the diagnosis flag is set at a thread level for a thread on which an instance of the SQL statement is running.

6. The method according to claim 1, wherein the diagnosis flag is set by adding a customized keyword to the SQL statement in response to the SQL statement being one of:
   a dynamic SQL statement; and
   an unbound static SQL statement.

7. The method according to claim 1, wherein the diagnosis flag is set by a customized database command in response to the SQL statement being a bound static SQL statement.

8. A system for controlling a dump for a database, comprising:
   a flag setting apparatus configured to set a diagnosis flag associated with a structured query language (SQL) statement, the diagnosis flag indicating whether to perform the dump;
   an SQL executing apparatus configured to execute the SQL statement; and
   a dump controlling apparatus configured to control the dump for the SQL statement according to the diagnosis flag associated with the SQL statement in response to the SQL executing apparatus executing the SQL statement,
   wherein the flag setting apparatus further comprises:
      a first setting apparatus configured to generate a customized database command in response to the SQL statement being a bound static SQL statement; and
      a command controlling apparatus configured to set the diagnosis flag by manipulating a package that contains the bound static SQL statement in response to the customized database command.

9. The system according to claim 8, wherein the flag setting apparatus further comprises:
   a second setting means configured to set the diagnosis flag by adding a customized keyword to the SQL statement in response to the SQL statement being one of:
      a dynamic SQL statement; and
      an unbound static SQL statement.

10. A computer program product for controlling a dump for a database, the computer program product comprising:
   a non-transitory tangible storage medium readable by a processing circuit and storing instructions for execution by the processing circuit for performing a method comprising:
      in response to a structured query language (SQL) statement being executed for the database, determining a state of a diagnosis flag associated with the SQL statement, the diagnosis flag indicating whether to perform a dump;
      performing, by a computer, a dump for the SQL statement m response to determining that the diagnosis flag indicates that a dump is to be performed; and
      for each of one or more processing steps for the SQL statement:
      executing the processing step;
      determining the state of the diagnosis flag in response to executing the processing step;
      accessing dump configuration information associated with the processing step; and
      performing the dump for the processing step based on the dump configuration information, in response to the dump configuration information indicating a dump is to be performed.

11. The computer program product according to claim 10, wherein the method further comprises generating dump data for the SQL statement based on the dump for the processing step.

12. The computer program product according to claim 10, wherein the method further comprises resetting the diagnosis flag as invalid in response to completion of the dump for the SQL statement.

13. The computer program product according to claim 10, wherein the method further comprises clearing temporary data generated during the dump in response to completion of the dump for the SQL statement.

14. The computer program product according to claim 10, wherein the diagnosis flag is set at a thread level for a thread on which an instance of the SQL statement is running.

15. The computer program product according to claim 10, wherein the diagnosis flag is set by adding a customized keyword to the SQL statement in response to the SQL statement being one of:
   a dynamic SQL statement; and
   an unbound static SQL statement.

16. The computer program product according to claim 10, wherein the diagnosis flag is set by a customized database command in response to the SQL statement being a bound static SQL statement.

17. A method of controlling a dump for a database, comprising:
   in response to a structured query language (SQL) statement being executed for the database, determining a state of a diagnosis flag associated with the SQL statement, the diagnosis flag indicating whether to perform a dump; and
   performing, by a computer, a dump for the SQL statement in response to determining that the diagnosis flag indicates that a dump is to be performed,
   wherein the diagnosis flag is set by adding a customized keyword to the SQL statement in response to the SQL statement being one of:
   a dynamic SQL statement; and
   an unbound static SQL statement.

* * * * *